(12) United States Patent
Horiguchi et al.

(10) Patent No.: US 8,993,954 B2
(45) Date of Patent: Mar. 31, 2015

(54) OPTICAL ENCODER HAVING A HIGH RESOLUTION DETECTION MODE TO DETECT A FINE PITCH PATTERN AND A LOW RESOLUTION DETECTION MODE TO DETECT A COARSE PITCH PATTERN

(75) Inventors: Haruhiko Horiguchi, Tokyo (JP); Chihiro Nagura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 13/370,560

(22) Filed: Feb. 10, 2012

(65) Prior Publication Data

US 2012/0217383 A1 Aug. 30, 2012

(30) Foreign Application Priority Data

Feb. 28, 2011 (JP) ................. 2011-042074

(51) Int. Cl.
*G01D 5/34* (2006.01)
*G01D 5/347* (2006.01)
(52) U.S. Cl.
CPC ........ *G01D 5/34746* (2013.01); *G01D 5/34715* (2013.01)
USPC ..................... 250/231.13; 250/205
(58) Field of Classification Search
USPC ............. 250/231.13, 205, 214 R, 231.16; 341/11, 13
See application file for complete search history.

(56) References Cited

U.S. PATENT DOCUMENTS 6,232,593 B1 * 5/2001 Taniguchi et al. ....... 250/231.13
6,452,159 B2    9/2002 Holzapfel et al.

FOREIGN PATENT DOCUMENTS

| CN | 2521583 Y | 11/2002 |
|---|---|---|
| CN | 1417633 A | 5/2003 |
| CN | 1580709 A | 2/2005 |
| CN | 1670486 A | 9/2005 |
| CN | 101403626 A | 4/2009 |
| EP | 2093543 A2 | 8/2009 |
| JP | 8068667 A | 3/1996 |
| JP | 2001146623 A | 5/2001 |
| JP | 2001194188 A | 7/2001 |
| JP | 2002-296075 A | 10/2002 |
| JP | 2004219380 A | 8/2004 |
| JP | 2005-300306 A | 10/2005 |
| JP | 2006-023220 A | 1/2006 |
| JP | 2009198318 A | 9/2009 |

OTHER PUBLICATIONS

Japanese Notification of Reason for Refusal dated Oct. 7, 2014, and English translation thereof, issued in Japanese Application No. 2011-042074.

* cited by examiner

*Primary Examiner* — Que T Le
(74) *Attorney, Agent, or Firm* — Canon USA Inc. IP Division (57) ABSTRACT

An optical encoder includes a light source, a scale which is irradiated by the light source and has a fine pitch pattern and a coarse pitch pattern in one track, a photo detector array which detects transmitting light or reflected light from the scale which are emitted from the light source, a signal processing unit including a first initial-stage amplifier unit that generates a position detection signal from the photo detector array, and a control unit that uses an output signal from the first initial-stage amplifier unit to control a light amount variation of the light source. The optical encoder can operate in a high resolution detection mode that forms the photo detector array at a first pitch to detect the fine pitch pattern and a low resolution detection mode that forms the photo detector array at a second pitch to detect the coarse pitch pattern.

5 Claims, 9 Drawing Sheets

OPTICAL ENCODER HAVING A HIGH RESOLUTION DETECTION MODE TO DETECT A FINE PITCH PATTERN AND A LOW RESOLUTION DETECTION MODE TO DETECT A COARSE PITCH PATTERN

BACKGROUND OF THE INVENTION

1. Field of the Invention

The present invention relates to an optical encoder that detects a positional displacement.

2. Description of the Related Art

Conventionally, an optical encoder is known as a displacement detection device that detects displacement of an object to be measured, such as an amount of movement and an amount of rotation. The optical encoder includes a light source, a scale which reflects or transmits light emitted from the light source and which can be displaced with respect to the light source, and a photo detector that receives the light reflected from the scale or the light transmitted through the scale. A pattern which reflects or transmits light is formed on the scale. The amount of light received by the photo detector is changed by the relative displacement of the scale. The displacement is detected on the basis of a detection signal generated by the change of the amount of light in the photo detector.

Figure 9:
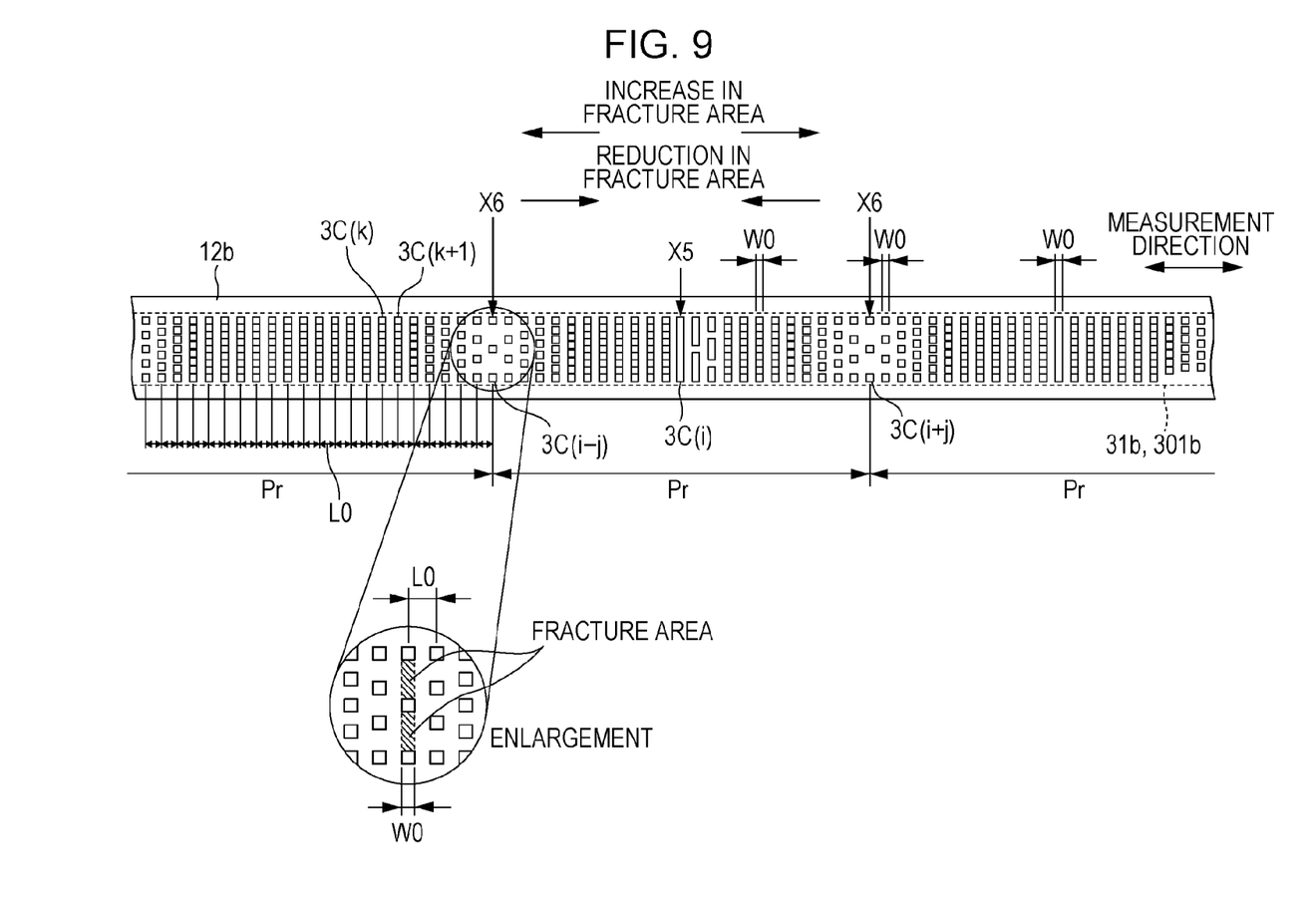
FIG. 9 is a diagram showing a conventional technique.

In EP2093543, such an optical encoder is disclosed. Specifically, as shown in FIG. 9, a method is disclosed in which a large amount of information can be obtained from a small number of scale tracks by forming a plurality of modulations having different pitches in a scale pattern on one track.

In addition to the prior example described above, according to the study of the inventors of the present invention, it has been known that there are unnecessary spatial frequency components described below in an image received on a sensor surface via the scale including a plurality of modulation pitches. Specifically, the unnecessary spatial frequency components are unnecessary spatial frequency components generated by interference between two diffracted light beams and unnecessary spatial frequency components included in transmittance distribution or reflectivity distribution of the scale. By the effect of the above, an error from an ideal sine wave occurs. As a result, a problem becomes obvious in which a position detection error occurs when converting the sine wave into a position signal by an arctangent calculation.

Figure 2:
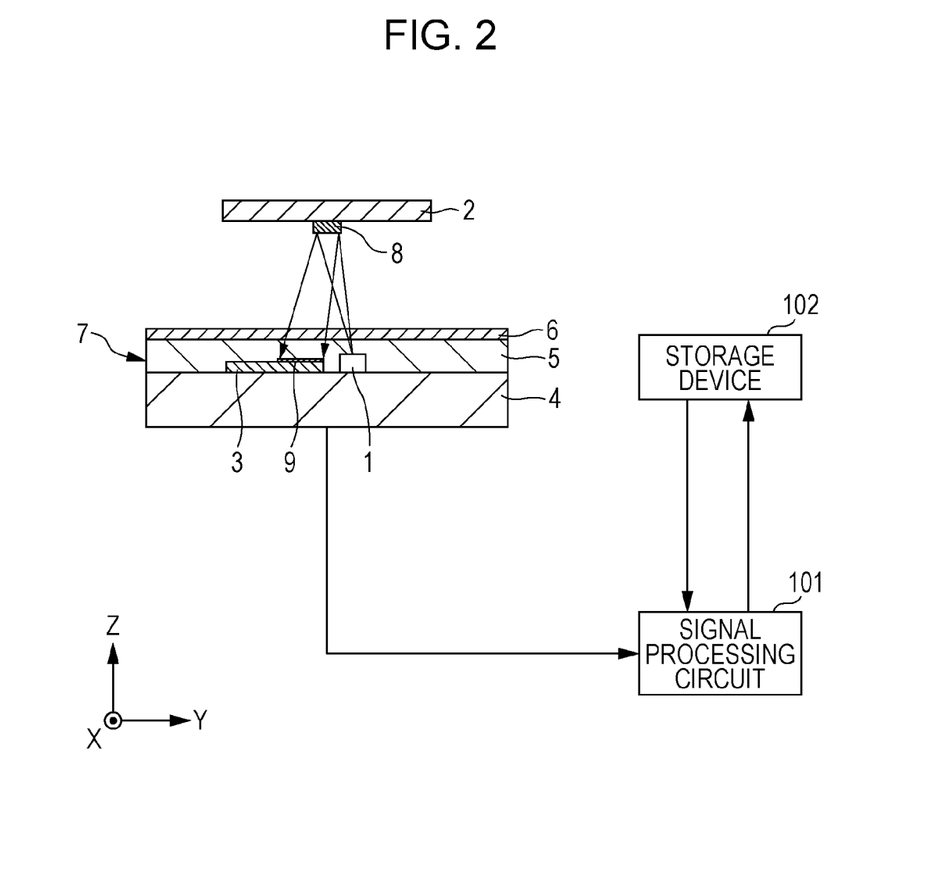
FIG. 2 is a schematic diagram showing a configuration of an optical encoder according to the embodiment of the present invention.
Figure 3:
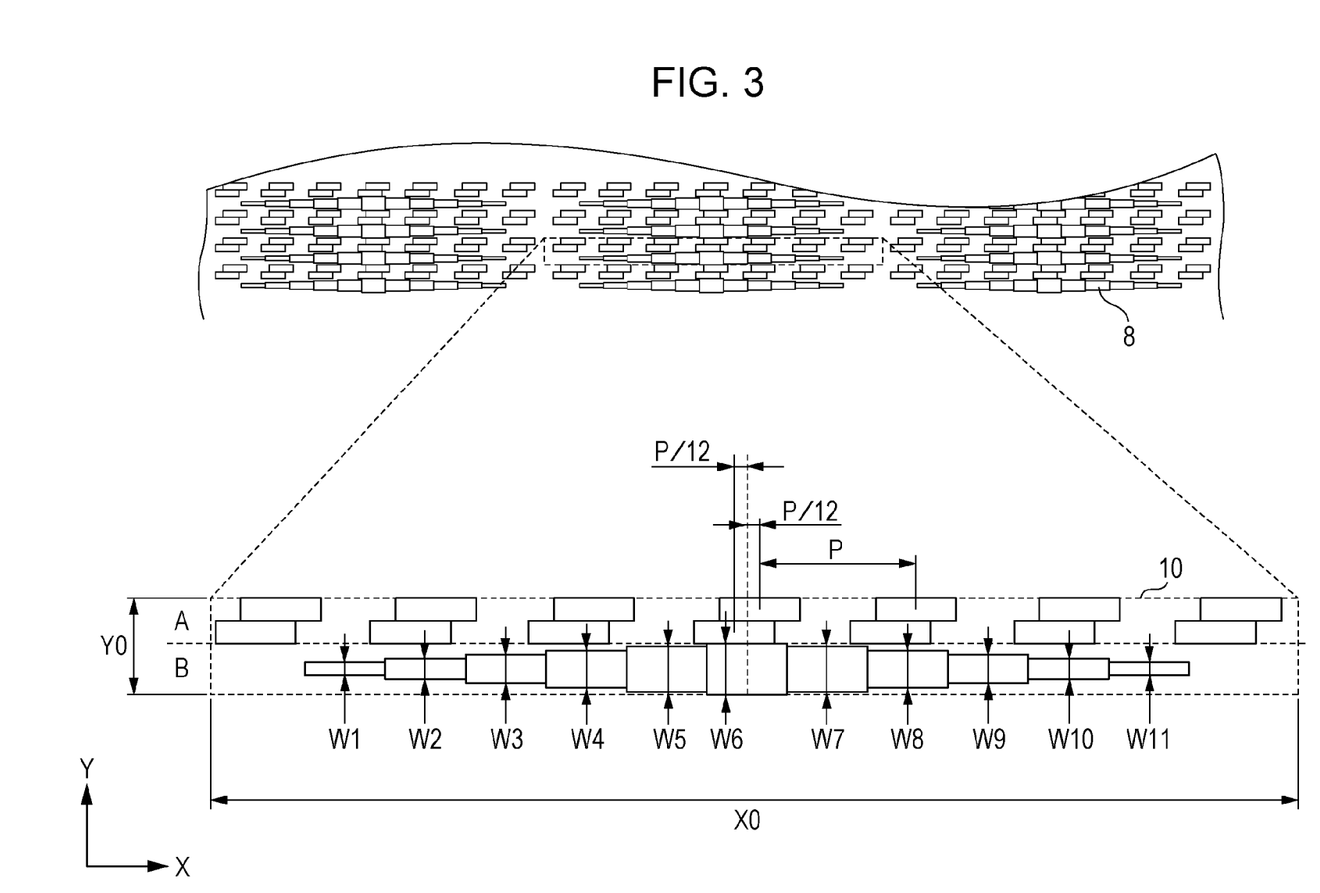
FIG. 3 is a plan view for explaining a configuration of a scale track according to the embodiment of the present invention.

To perform position detection with a high degree of accuracy, it is necessary to reduce an error component of a detected wave by reducing the unnecessary spatial frequency components generated by interference between two diffracted light beams and the unnecessary spatial frequency components included in transmittance distribution or reflectivity distribution of the scale in the image received on the sensor surface. FIG. 2 shows an entire schematic configuration of an optical encoder considered to be an example of a method for solving this problem. Specifically, this example is a method for switching a detection resolution and obtaining a signal by using a scale as shown in FIG. 3 and a light receiving surface arrangement and a sensor signal processing circuit shown in FIGS. 6 to 8. This method will be described below as a comparative example of the present invention.

Comparative Example

Figure 6:
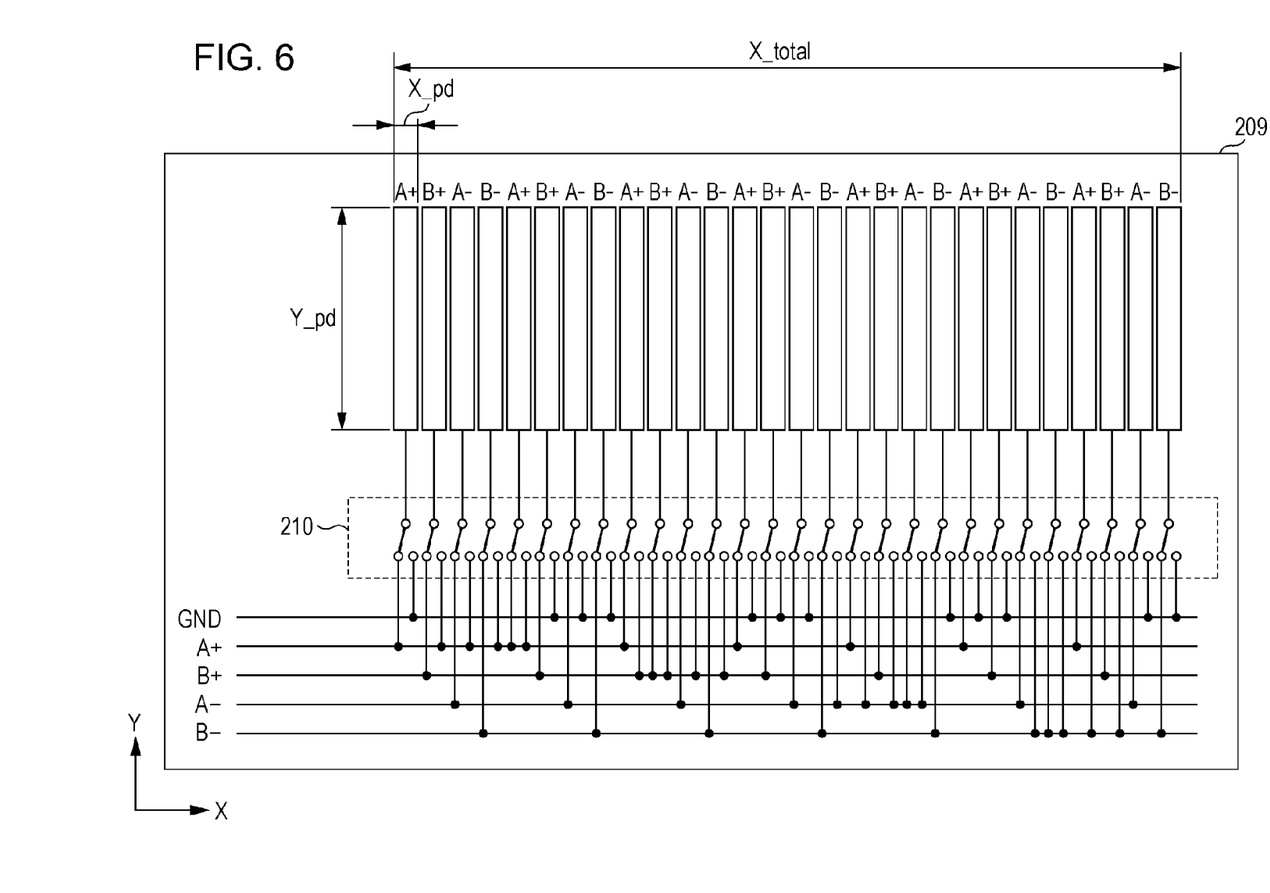
FIG. 6 is a plan view showing an arrangement of a light receiving surface of a photodiode array in high-resolution detection mode according to a comparative example.
Figure 7:
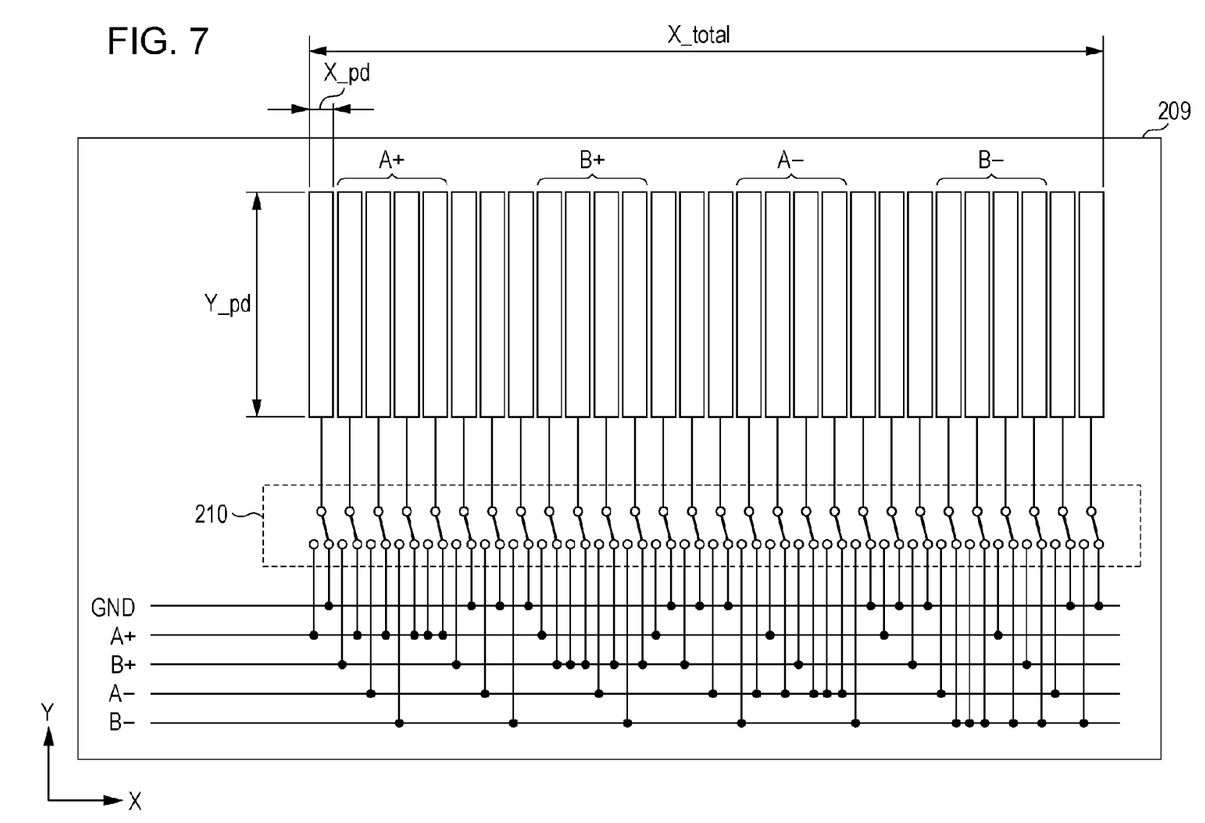
FIG. 7 is a plan view showing an arrangement of a light receiving surface of a photodiode array in low-resolution detection mode according to the comparative example.

This method uses a scale (for example, scale 2 shown in FIG. 3) including a fine pitch pattern and a coarse pitch pattern in one track and switches a detection resolution to detect the fine pitch pattern and the coarse pitch pattern by using a photodiode array working as a common sensor. An output signal of an encoder will be described. FIGS. 6 and 7 show an example of a light receiving surface arrangement of a photodiode array 209 which is a photo detector array. In FIGS. 6 and 7, 28 photodiodes are arranged at 50 μm pitch in the X axis direction in the photodiode array 209.

One photodiode has an X-direction width X_pd of 50 μm and a Y-direction width Y_pd of 800 μm. The total width X_total of the photodiode array 209 is 1400 μm. Although, in the present embodiment, a case is will be described in which the Y-direction width Y_pd is 800 μm, it is not limited to this, and the Y_pd may be a multiple of 2×n (n is a natural number) of a Y-direction width Y0 of the scale track 8.

Figure 8:
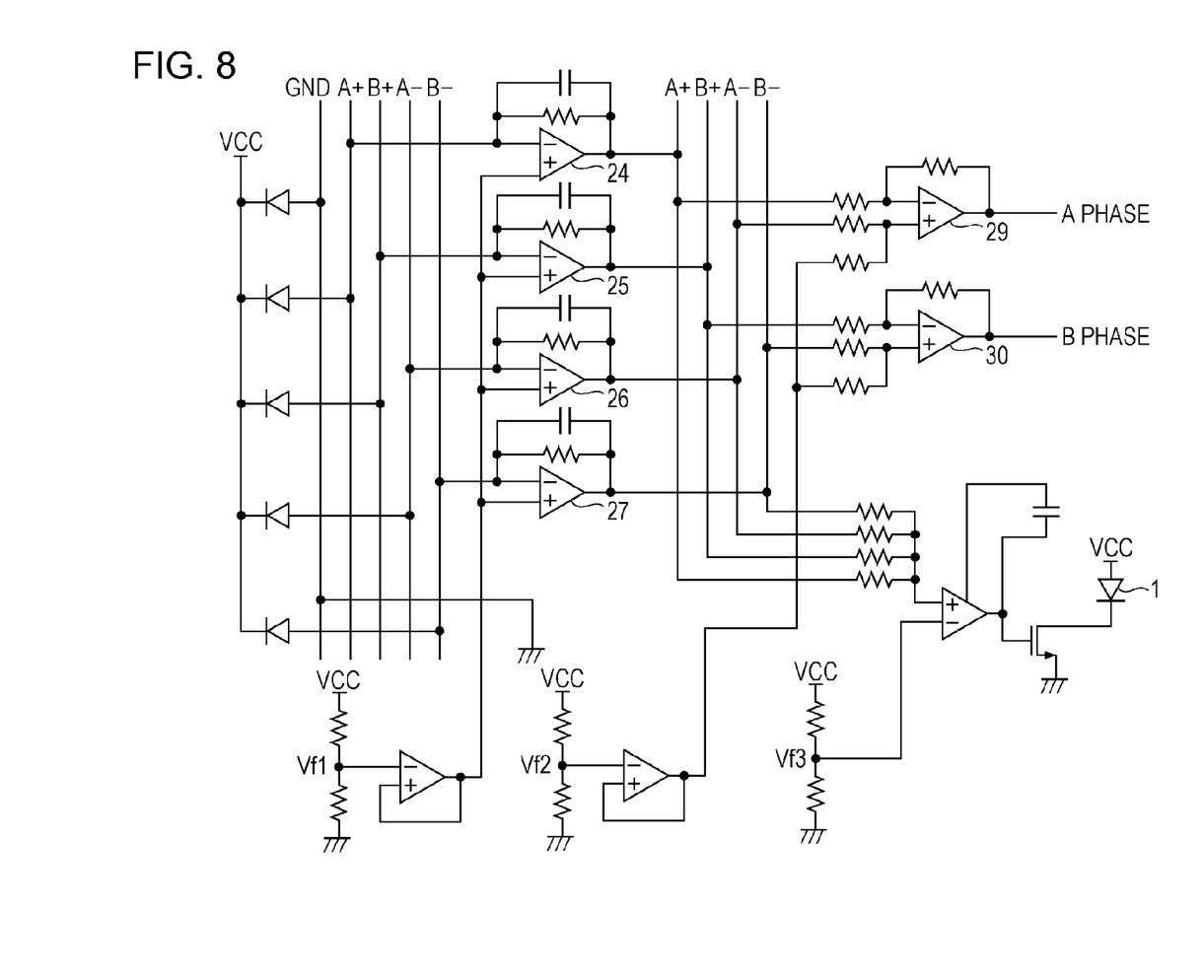
FIG. 8 is an illustration of a signal processing circuit unit of a sensor according to the comparative example.

The outputs from each of the photodiodes are switched by switches 210 shown in FIGS. 6 and 7 and a switch circuit not shown in the figures. The outputs from each of the photodiodes are selectively connected to one of four initial-stage amplifiers in the next stage in order to generate four-phase sine wave outputs described below. In FIG. 8, the four initial-stage amplifiers (24, 25, 26, 27) are IV conversion amplifiers and the outputs from the four initial-stage amplifiers respectively correspond to S(A+), S(B+), −S(A−), and −S(B−) of the four-phase sine wave outputs.

The switch circuit for switching the detection resolution can switch connections by inputting a signal into the switches 210 from the outside. When the input signal is high-level, as shown in FIG. 6, a detection pitch for a scale pattern pitch P=100 μm (reflection image pitch of 200 μm) is set. When the input signal is low-level, as shown in FIG. 7, a detection pitch for a scale pattern pitch X0=700 μm (reflection image pitch of 1400 μm) is set. In this way, a configuration capable of switching the detection resolution is used. The position of the scale is located at the middle position between the light source and the photodiode array, so that the reflection image pitch on the photodiode array is two times the scale pattern pitch.

Here, as shown in FIG. 6, at a detection pitch of 100 μm, the total width of the photodiodes related to the signals is 1400 μm, which corresponds to the reflection image pitch of a modulation component of the scale pattern of 700 μm pitch (=X0). As shown in FIG. 7, at a detection pitch of 700 μm, every four adjacent photodiodes are electrically connected while unused photodiodes remain. The technical object of the above will be described later in detail.

Regarding the relative phases of the four-phase sine wave with respect the detection pitch, if the relative phase of S(A+) is 0 degrees, the relative phase of S(B+) is +90 degrees, the relative phase of S(A−) is +180 degrees, and the relative phase of S(B−) is +270 degrees. Two-phase sinusoidal wave signals S(A) and S(B) are generated from these outputs by the signal processing circuit 101, and a phase signal is obtained by further performing an arctangent calculation on these signals.

$$S(A)=S(A+)-S(A-)$$

$$S(B)=S(B+)-S(B-)$$

(APC in Comparative Example)

Here, in the comparative example including the above resolution switching configuration, a sensor signal processing circuit unit shown in FIG. 8 is provided to perform APC (automatic power control) to control the light amount of the light source. Specifically, the four initial-stage amplifiers (24, 25, 26, 27) for forming the four-phase sine wave outputs are also used to generate an APC control signal.

In the signal processing circuit shown in FIG. 8, the four-phase sine wave outputs S(A+), S(B+), S(A−), and S(B−) are calculated via an A-phase differential amplifier 29 and a B-phase differential amplifier 30 to detect position, and the two-phase sine wave signals S(A) and S(B) are obtained. At this time, the photodiodes that are not used to generate the four-phase sine wave outputs after the switching of the detection resolution are connected to GND (ground) (FIG. 8). The APC for controlling the light amount of the light source is performed by using basically outputs from the four IV conversion amplifiers (24, 25, 26, 27).

In this configuration, the number of the photodiodes used to output the four-phase sine wave changes due to the switching of the detection resolution, so that the number of the photodiodes used to perform APC changes. As a result, the light amount of the light source changes due to the switching of the detection resolution.

Therefore, there is a problem as described below. First, when the light amount of the light source decreases after the switching of the detection resolution, the amplitude of the two-phase sine wave (A-phase and B-phase) temporarily becomes larger than a desired value until the APC responds, so that there is a risk that the amplitude of the signal saturates. On the other hand, when the light amount of the light source increases after the switching of the detection resolution, the amplitude of the two-phase sine wave (A-phase and B-phase) does not reach a desired value temporarily until the APC responds.

Further, if the amplitude of the signal is suppressed to a level at which the amplitude of the signal does not saturate after the switching of the detection resolution, when the light amount of the light source increases after the switching of the detection resolution, the amplitude of the signal cannot be sufficiently large after the APC responds, so that it is difficult to obtain high S/N. As described above, when the number of the photodiodes used to perform APC changes due to the switching of the detection resolution, that is, when the light amount to be controlled by the APC changes, the amplitude of the signal may saturate after the switching of the detection resolution or S/N for securing a wide dynamic range may decrease, so that error in position detection may occur. Therefore, there is a problem that it is difficult to perform position detection, which variously uses resolutions before and after the switching of the resolution, with a high degree of accuracy.

SUMMARY OF THE INVENTION

The present invention provides an optical encoder including a light source, a scale which is irradiated by the light source and has a fine pitch pattern and a coarse pitch pattern in a measuring direction in one track, a photo detector array which is used for both the fine pitch pattern and the coarse pitch pattern and detects transmitting light or reflected light from the scale which are emitted from the light source, a signal processing unit including a first initial-stage amplifier unit that generates a position detection signal from the photo detector array, a high resolution detection mode that forms the photo detector array at a first pitch in the measuring direction to detect the fine pitch pattern, a low resolution detection mode that forms the photo detector array at a second pitch in the measuring direction to detect the coarse pitch pattern, and a control unit that uses an output signal from the first initial-stage amplifier unit to control a light amount variation of the light source. The control unit includes a second initial-stage amplifier unit to which an output of an unused photo detector is inputted when there is the unused photo detector which is not used to detect position in at least one of the high resolution detection mode and the low resolution detection mode, and the control unit controls the light amount variation of the light source on the basis of a sum signal of output signals from the first initial-stage amplifier unit and the second initial-stage amplifier unit when there is the unused photo detector.

Further features of the present invention will become apparent from the following description of exemplary embodiments with reference to the attached drawings.

DESCRIPTION OF THE EMBODIMENTS

Therefore, in view of the above problem, the present invention provides an optical encoder that can suppress the variation of the amount of light of the light source even when there are photo detectors, which are not used to generate position detection signals, due to a resolution change.

First Embodiment

FIG. 2 shows a configuration of an optical encoder according to an embodiment of the present invention. The measuring direction of the encoder is perpendicular to a paper surface. The encoder includes a scale 2 attached to a movable portion and a sensor unit 7 attached to a fixed portion. The sensor unit 7 includes a light source 1 including an LED, a photo detector 3 including a photodiode array 9 which is a photo detector array, and a semiconductor element including a photo IC chip containing a signal processing circuit unit. The sensor unit 7 is a sensor unit in which a printed circuit board 4 on which the above components are mounted is installed in the same package and a light emitting unit and a light receiving unit are integrated into one body.

The scale 2 includes a scale track 8 obtained by patterning a chromium reflective film on a glass substrate. A divergent light flux emitted from the light source 1 in the sensor unit 7 is irradiated to the scale track 8 on the scale 2. The light flax reflected from the scale track 8 including a fine pitch pattern and a coarse pitch pattern in one track is directed to the photodiode array 9 used to detect both the fine pitch pattern and the coarse pitch pattern. Here, the pitch of the fine pitch pattern (may be assumed to be a pitch at which reflective film areas are formed or a distance between the reflective film areas) has to be shorter than the pitch of the coarse pattern. Preferably, the pitch of the coarse pitch pattern is desired to be three times or more (more preferably five times or more) the pitch of the fine pitch pattern.

The light source 1 and the photodiode array 8 are on the same plane in parallel with a plane of the scale track 8. The light flux is emitted from the light source 1, reflected by the scale track 8, and reaches the photodiode array 9. In other words, the scale track 8 is located at the middle position of an optical path from the light source 1 to the photodiode array 9. Thereby, the light flux is received on the photodiode array 9 as an image of a reflectivity distribution of the scale track 8 which is enlarged two times. The reflected light flux received by the photodiode array 9 is converted into an electrical signal and transmitted to a signal processing circuit 101 shown in FIG. 2 as an encoder signal. The signal processing circuit 101 performs interpolation processing of the encoder signal obtained by the sensor unit 7, reads and writes a signal from and to a storage device 102, and outputs a position signal.

(Scale Including a Fine Pitch Pattern and a Coarse Pitch Pattern)

FIG. 3 shows an enlarged diagram of a part of the scale track 8 of the scale 2 including a fine pitch pattern and a coarse pitch pattern in one track. The scale track 8 has a pattern in which unit block patterns 10 are periodically arranged in a moving direction which is the measuring direction (X axis direction) and a direction (Y axis direction) perpendicular to the moving direction, respectively. The unit block pattern 10 of the scale track 8 has an X-direction width X0 of 700 µm and a Y-direction width Y0 of 50 µm.

The unit block pattern 10 includes an area (area A) of a pattern row in which patterns having an X-direction width of 50 µm are arranged at a pitch P of 100 µm at regular intervals as the fine pitch pattern and an area (area B) of a modulation pattern row in which patterns are arranged at a pitch of 700 µm as the coarse pitch pattern. The area A and the area B have the same width of 25 µm in the Y axis direction.

The area A is further divided into two areas, both having a height of 12.5 µm in the Y-direction, and the pattern rows are shifted from each other by ±(100/12) µm respectively in the X axis direction with respect to the center reference line of the unit block pattern. By using the configuration described above, the intensity distribution of a scale reflection image is integrated on the light receiving surface area of the sensor, so that a threefold periodic component of the 100 µm pitch is canceled and distortion from an ideal sine wave is suppressed. Although, in the present embodiment, only the threefold periodic component is suppressed, it is not limited to this, and it is possible to use a multi-level shift or a continuous shift to cancel other periodic components.

In the area B, eleven reflective patterns each having an X-direction width of 50 µm are arranged in a row. The widths of the reflective patterns in the Y axis direction are as follows: W1=5 µm, W2=9 µm, W3=16 µm, W4=20 µm, W5=25 µm, W6=25 µm, W7=25 µm, W8=20 µm, W9=16 µm, W10=9 µm, and W11=5 µm.

Although, in the present embodiment, a case is described in which the area A has patterns at 100 µm pitch and the area B has patterns at 700 µm pitch as a scale pattern, the present invention is not limited to this. Specifically, the ratio of the pitches of the patterns in the two areas should be an odd multiple of 1 in order to cancel the unnecessary periodic component.

(Photodiode Array and Signal Processing Circuit Capable of Switching Detection Resolution)

Figure 1:
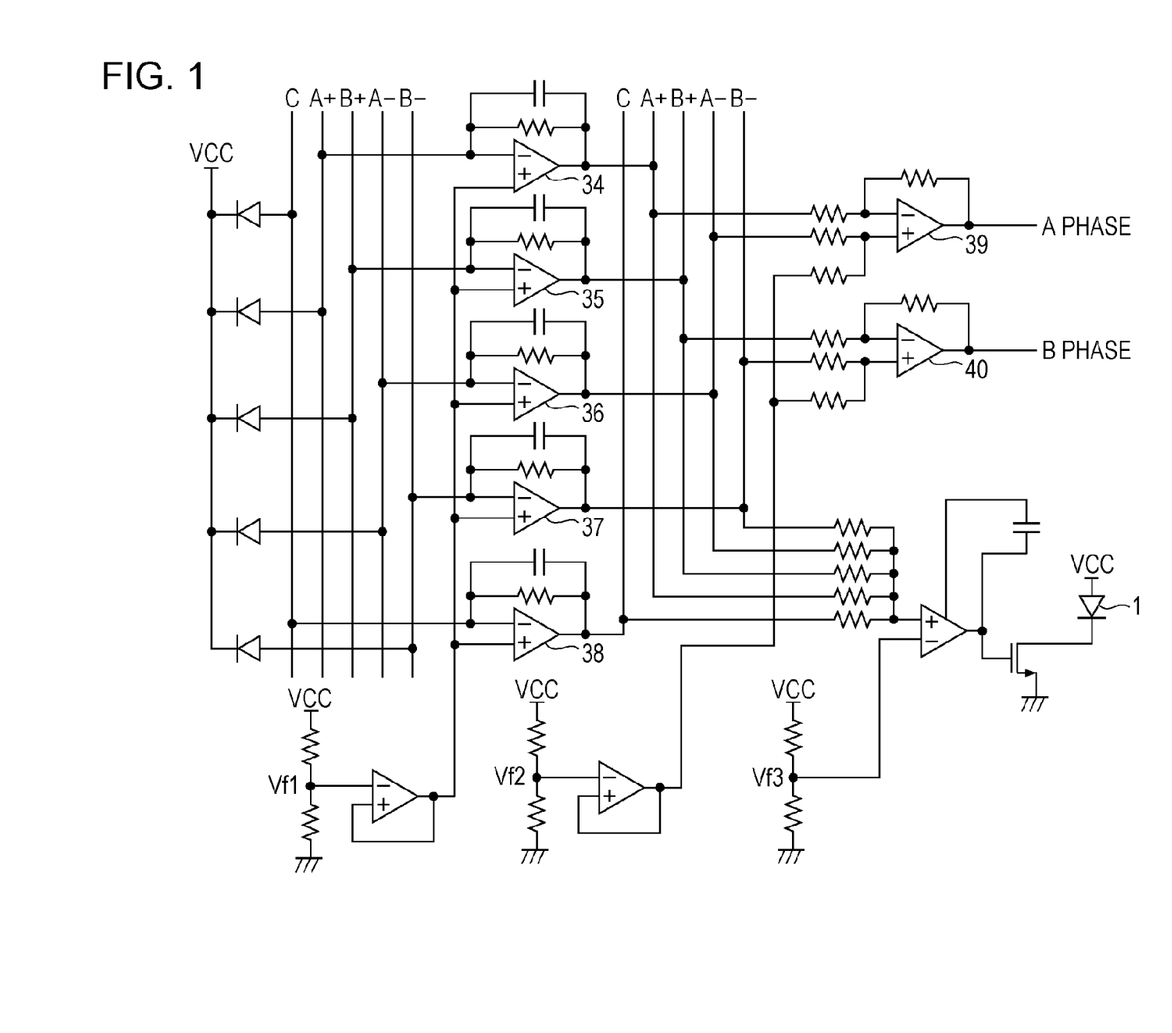
FIG. 1 is an illustration of a signal processing circuit unit of a sensor according to an embodiment of the present invention.
Figure 4:
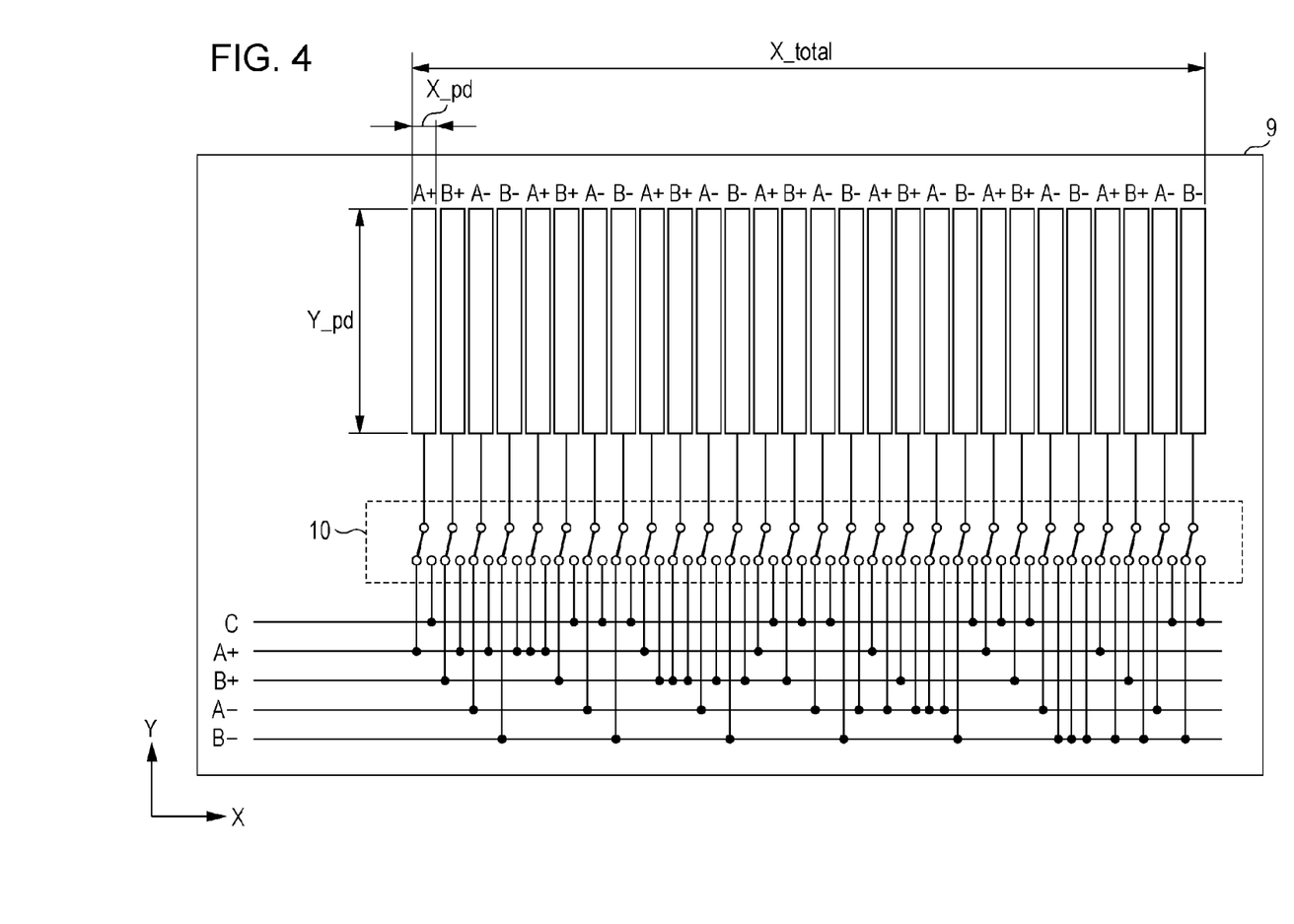
FIG. 4 is a plan view showing an arrangement of a light receiving surface of a photodiode array in high-resolution detection mode according to the embodiment of the present invention.
Figure 5:
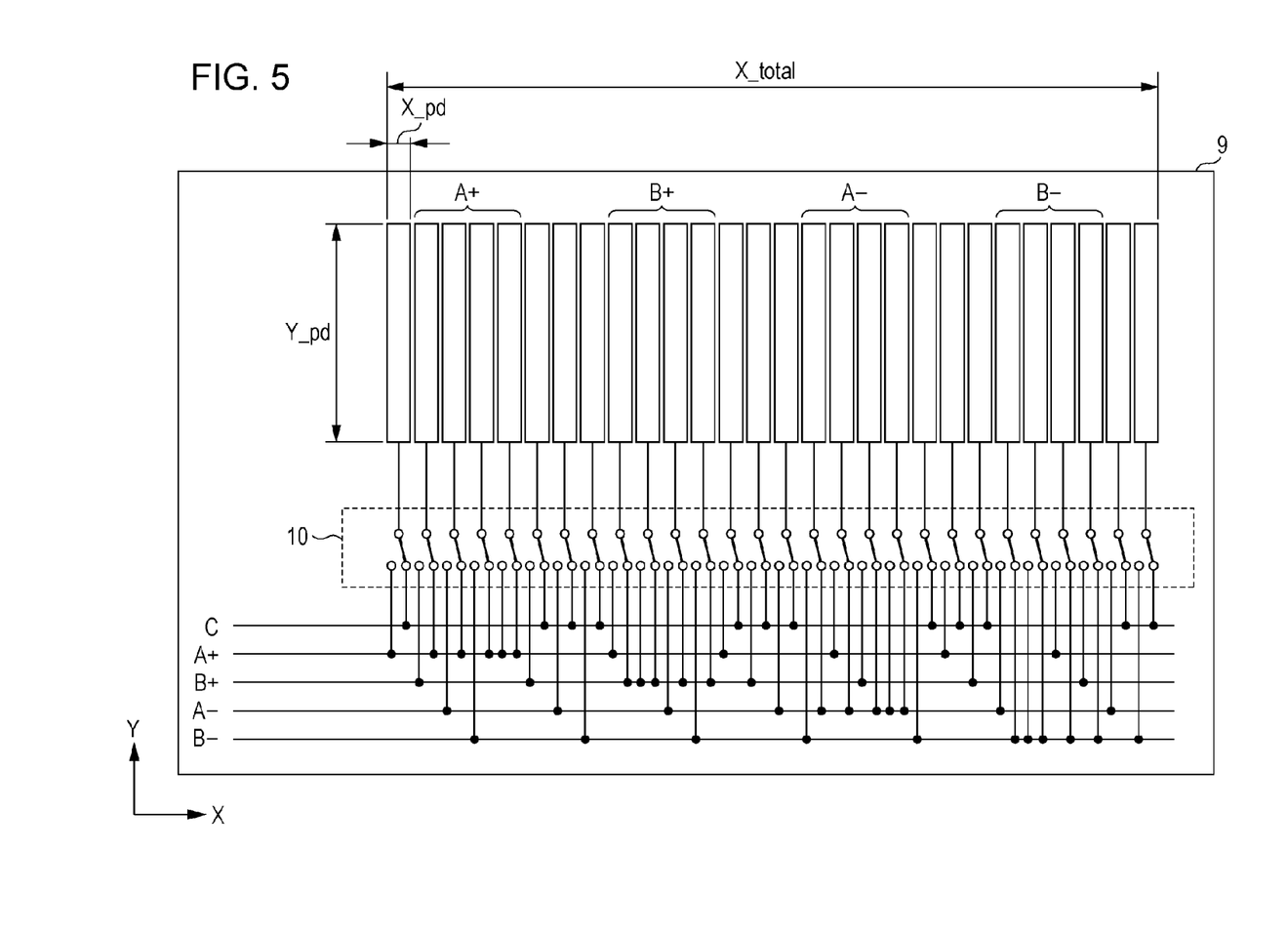
FIG. 5 is a plan view showing an arrangement of a light receiving surface of a photodiode array in low-resolution detection mode according to the embodiment of the present invention.

Next, the switching of the detection resolution and the signal processing circuit of the present embodiment will be described with reference to FIGS. 1, 4, and 5. FIG. 1 is a diagram for explaining the signal processing circuit unit of the sensor according to the present embodiment. FIG. 4 shows an arrangement of a light receiving surface of the photodiode array 9 in a high-resolution detection mode for detecting a fine pitch pattern. FIG. 5 shows an arrangement of a light receiving surface of the photodiode array 9 in a low-resolution detection mode for detecting a coarse pitch pattern.

In the same manner as in FIGS. 6 and 7, the photodiode array 9 shown in FIGS. 4 and 5 has 28 photodiodes in a row at 50 µm pitch in the X axis direction. One photodiode has an X-direction width X_pd of 50 µm and a Y-direction width Y_pd of 800 µm. The total width X_total of the photodiode array 9 is 1400 µm. The outputs from each of the photodiodes are switched by switches 10 shown in FIGS. 4 and 5 and a switch circuit not shown in the figures and selectively connected to one of four initial-stage amplifiers in the next stage.

The outputs from the four initial-stage amplifiers respectively correspond to S(A+), S(B+), S(A−), and S(B−) of four-phase outputs. The reason to use four-phase sine wave outputs is to obtain a signal in which a direct-current component is removed and amplitude is doubled and to be able to determine a moving direction.

Here, a total light receiving width of the photodiode array for detecting a fine pitch pattern in the measuring direction is set to an integral multiple of a light receiving width of the photodiode array, which detects a coarse pitch pattern and which corresponds to the pitch of the coarse pitch pattern, in the measuring direction (here 1400 µm, which is a 1 multiple). Here, a light receiving width for detecting a coarse pitch pattern in the measuring direction is set to an integral multiple of each light receiving width of the photodiode array, which detects a fine pitch pattern and which corresponds to the pitch of the fine pitch pattern of the scale, in the measuring direction (here 200 µm, which is a 1 multiple).

(Switching of Resolution)

When an input to the switch circuit is high-level, as shown in FIG. 4, the high resolution detection mode is set and a detection pitch for a scale pattern 100 µm (a first pitch: reflection image pitch of 200 µm) is set. On the other hand, when an input to the switch circuit is low-level, as shown in FIG. 5, the low resolution detection mode is set and a detection pitch for a scale pattern 700 µm (a second pitch: reflection image pitch of 1400 µm) is set.

(Low Resolution Detection Mode)

At a detection pitch of 700 µm in the low resolution detection mode, every four adjacent photodiodes are electrically connected. Thereby, outputs of each of A+, B+, A−, and B− in FIG. 5 are summed up in the width of 200 µm which corresponds to the reflection image pitch of the modulation component of the scale pattern of 100 µm pitch, so that it is possible to reduce effects of the modulation component of 100 µm pitch which affect the output.

Outputs of unused sensors of the photodiode array 9 that are not used to detect position during the low resolution detection mode are not inputted into the initial-stage amplifiers.

(High Resolution Detection Mode)

At a detection pitch of 100 µm in the high resolution detection mode, the total width of the photodiodes related to the signals is 1400 µm, which corresponds to the reflection image pitch of the modulation component of the scale pattern of 700 µm. Therefore, it is possible to reduce effects of the fluctuation of the output amplitude that varies due to the modulation component of 700 µm pitch. Thereby, outputs of each of A+, B+, A−, and B−, which are separately arranged in FIG. 4, are summed up in the range of 1400 µm which corresponds to the reflection image pitch of the modulation component of the scale pattern of 700 μm pitch, so that it is possible to reduce effects of the modulation component of 700 μm pitch which affect the output.

(Forming Phase Signal)

As shown in FIG. 1, four IV conversion amplifiers (34, 35, 36, 37) are formed as the initial-stage amplifiers (first initial-stage amplifiers) used to form position detection signals of the four-phase sine wave outputs S(A+), S(B+), S(A−), and S(B−). Regarding the relative phases of the four-phase sine wave with respect the detection pitch, if the relative phase of S(A+) is 0 degrees, the relative phase of S(B+) is +90 degrees, the relative phase of S(A−) is +180 degrees, and the relative phase of S(B−) is +270 degrees. The calculations described below are performed for these outputs in a signal processing circuit 101 shown in FIG. 2.

$$S(A)=S(A+)-S(A-)$$

$$S(B)=S(B+)-S(B-)$$

Two-phase sinusoidal wave signals S(A) and S(B) from which a direct-current component is removed are formed by performing the above calculations and a phase signal is obtained by further performing an arctangent calculation on these signals.

(Generation Mechanism of Each Frequency Component and Removal of Unnecessary Components)

Here, generation mechanism of each frequency component and removal of unnecessary components will be described. A diffraction angle distribution from the scale pattern is obtained by Fourier transform of the reflectivity distribution. In the scale track 8 of the present embodiment, the reflectivity distribution in the measuring direction (X-direction) is a sum of the reflectance modulation at the 100 μm pitch in constant amplitude and the reflectance modulation at the 700 μm pitch in constant amplitude. Thereby, a main diffraction component is formed of five components, which are the zero-order light, ±1-order diffracted light by the coarse pitch (700 μm pitch), and ±1-order diffracted light by the fine pitch (100 μm pitch).

Regarding these diffracted light beams, the spatial frequency of interference fringes caused by interference between the diffracted light beams is determined by a difference between the diffraction angles of the diffracted light beams interfering with each other. The coarse pitch is seven times the fine pitch, so that the diffraction angle of the fine pitch is seven times the diffraction angle of the coarse pitch. Thereby, if the spatial frequency of two-times enlarged image of the fine pitch is defined as if (the spatial frequency component of if is generated by the interference between the zero-order light and the ±1-order diffracted light by the coarse pitch), the spatial frequency component of 7f is generated by the interference between the zero-order light and the ±1-order diffracted light by the fine pitch.

In addition to the spatial frequency component of if and the spatial frequency component of 7f that should be detected, unnecessary spatial frequency components 2f, 6f, 8f, and 14f are generated. Specifically, the spatial frequency component 2f is generated by the interference between the ±1-order diffracted light beams by the coarse pitch, and the spatial frequency component 6f is generated by the interference between the +1-order (−1-order) diffracted light beam by the fine pitch and the +1-order (−1-order) diffracted light beam by the coarse pitch. The spatial frequency component 8f is generated by the interference between the +1-order (−1-order) diffracted light beam by the fine pitch and the −1-order (+1-order) diffracted light beam by the coarse pitch, and the spatial frequency component 14f is generated by the interference between the ±1-order diffracted light beams by the fine pitch.

In the low resolution detection mode, regarding the spatial frequency component included in the diffraction image reflected from the scale, an almost ideal sine wave, in which unnecessary frequency components are reduced and there is only the spatial frequency component 1f, can be obtained as described below. The removal of the unnecessary components are performed as described below. In the low resolution detection mode, outputs of four adjacent photodiodes (A+, B+, A−, and B− in FIG. 5) are summed up. Specifically, outputs in the width of 200 μm which corresponds to the reflection image pitch of the modulation component of the scale pattern of 100 μm pitch are summed up, so that it is possible to reduce effects of the modulation component of 100 μm pitch which affect the output. Thereby, the unnecessary component 7f can be removed.

Further, even-ordered components such as the unnecessary frequency components 2f, 6f, 8f, and 14f are removed by a calculation of S(A)=S(A+)−S(A−) by the signal processing circuit connected to the sensor array. As a result, the unnecessary frequency components are removed and an almost ideal sine wave of if can be obtained.

In the high resolution detection mode, outputs of seven separate photodiodes of each of A+, B+, A−, and B− in FIG. 4 are summed up. Specifically, outputs of each of A+, B+, A−, and B− in the range of 1400 μm which corresponds to the reflection image pitch of the modulation component of the scale pattern of 700 μm pitch are summed up, so that it is possible to reduce effects of the modulation component of 700 μm pitch which affect the output. Thereby, the unnecessary component if can be removed.

Further, even-ordered components such as the unnecessary frequency components 2f, 6f, 8f, and 14f are removed by a calculation of S(A)=S(A+)−S(A−) by the signal processing circuit connected to the sensor array. As a result, the unnecessary frequency components are removed and an almost ideal sine wave of 7f can be obtained.

(APC Control)

The light amount variation of the light source 1 that irradiates the scale track 8 on the scale 2 is controlled by an APC (automatic power control) control circuit so that the sum of the outputs of the photodiode array 9 is constant at all times. Here, the APC control circuit uses the IV conversion amplifiers (34, 35, 36, 37) for detecting a position as the first initial-stage amplification units and uses output signals from the IV amplifiers. Specifically, the IV conversion amplifiers (34, 35, 36, 37) are amplification units used for both the position detection and the light amount control of the light source. In the APC control circuit, all the outputs from the elements of the photodiode array 9 used for the position detection are inputted into the initial-stage amplification circuit and the light amount of the light source is controlled.

Here, in the high resolution detection mode and/or the low resolution detection mode, there may be unused photo detectors, which are not used to detect position. In this case, if there are unused photo detectors, the sum of the outputs from the elements of the photodiode array 9 used to detect position decreases. The unused photo detectors occur in the low resolution detection mode as described above. In addition, there are a case in which the unused photo detectors occur in only the high resolution detection mode and a case in which the unused photo detectors occur in both the high resolution detection mode and the low resolution detection mode.

An example of the latter case is a case in which, in FIG. 4, among the 28 photo detectors, from the left, the first element, the sixth to eighth elements, 13th to 15th elements, 20th to 22nd elements, and 27th and 28th elements are set to the unused photo detectors, which is an arrangement similar to that of FIG. 5.

An example of the former case is a case in which, in FIG. 4, among the 28 photo detectors, from the left, the third, 11th, and 19th elements of A+ phase, the fifth, 13th, and 21st elements of B+ phase, the seventh, 15th, and 23rd elements of A− phase, and the ninth, 17th, and 25th elements of B− phase are set to the photo detectors used to detect position and the photo detectors other than the above are set to the unused photo detectors.

Therefore, in the present embodiment, in addition to the four IV conversion amplifiers (34, 35, 36, 37) which are the first initial-stage amplifiers, an IV conversion amplifier 38, which is the No. 5 initial-stage amplifier, is provided as a second initial-stage amplifier. The photodiodes that are not used to generate the four-phase sine wave outputs after the switching of the detection resolution are connected to the IV conversion amplifier 38 which is the No. 5 initial-stage amplifier.

Thereby, when switching the detection resolution by inputting an external signal into the switch circuit, S(C) from the No. 5 IV conversion amplifier is outputted along with the four-phase sine wave outputs S(A+), S(B+), S(A−), and S(B−). The APC (automatic power control) of the light source 1 is performed by using a sum signal of all the outputs (S(A+), S(B+), S(A−), S(B−), S(C)) outputted from the first initial-stage amplifier units and the second initial-stage amplifier unit via the five IV conversion amplifiers. Thereby, it is possible to avoid the variation of the light amount of the light source before and after the switching of the resolution.

As described above, even when there are photodiodes which are not used to generate the position detection signals due to a resolution change, it is possible to perform the APC (automatic power control) at all times using the sum signal of signals transmitting the amount of light received by all the photodiodes. Therefore, it is possible to avoid the variation of the light amount of the light source when switching the resolution. As a result, it is possible to obtain detection signals at a resolution after switching the resolution at high speed and with a high degree of accuracy without depending on an APC response time while maintaining stability of the light amount of the light source, which should be originally achieved by the APC which stabilizes the variation of the light source characteristics over time. Further, it is possible to perform position detection, which variously uses resolutions before and after the switching of the resolution, at high speed and with a high degree of accuracy without depending on the APC response time.

Modified Example

Although, in the above description, the light reflected from the scale is detected by the photodiode array, transmitting light from the scale may be detected instead of the reflected light. It is of course possible to appropriately combine technical components described in the above embodiment within the technical idea of the present invention.

According to the present invention, even when there are photo detectors which are not used to generate the position detection signals due to the resolution change, it is possible to perform the APC using the sum signal of signals transmitting the amount of light received by all the photo detectors. Therefore, it is possible to suppress the variation of the light amount of the light source before and after the switching of the resolution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-042074 filed Feb. 28, 2011, which is hereby incorporated by reference herein in its entirety.

What is claimed is:

1. An optical encoder comprising:
a light source;
a scale configured to be irradiated by the light source and have a fine pitch pattern and a coarse pitch pattern in a measuring direction in one track;
a photo detector array configured to be used for both the fine pitch pattern and the coarse pitch pattern and detect transmitting light or reflected light from the scale, the transmitting light and the reflected light being emitted from the light source;
a signal processing unit including a first initial-stage amplifier unit configured to generate a position detection signal from the photo detector array; and
a control unit configured to use an output signal from the first initial-stage amplifier unit to control a light amount variation of the light source,
wherein
the optical encoder is configured to operate in a high resolution detection mode to form an arrangement of a light receiving surface of the photo detector array at a first pitch in the measuring direction to detect the fine pitch pattern and a low resolution detection mode to form an arrangement of a light receiving surface of the photo detector array at a second pitch in the measuring direction to detect the coarse pitch pattern,
the optical encoder includes a second initial-stage amplifier unit to which an output of an unused photo detector of the photo detector array is inputted when there is the unused photo detector which is not used to detect position in at least one of the high resolution detection mode and the low resolution detection mode, and
the control unit controls the light amount variation of the light source on the basis of a sum signal of output signals from the first initial-stage amplifier unit and the second initial-stage amplifier unit when there is the unused photo detector.

2. The optical encoder according to claim 1, wherein the first initial-stage amplifier unit includes four initial-stage amplifier units corresponding to four phase outputs from the photo detector array.

3. The optical encoder according to claim 1, wherein there are the unused photo detectors in the high resolution detection mode or the low resolution detection mode and outputs of the unused photo detectors are inputted into the second initial-stage amplifier unit.

4. The optical encoder according to claim 1, wherein there are the unused photo detectors in the high resolution detection mode and the low resolution detection mode and outputs of the unused photo detectors are inputted into the second initial-stage amplifier unit.

5. An optical encoder comprising:
a measuring object; and
an optical encoder configured to detect a movement distance or a rotational amount of the measuring object,
wherein the optical encoder comprising:
a light source;

a scale configured to be irradiated by the light source and have a fine pitch pattern and a coarse pitch pattern in a measuring direction in one track;

a photo detector array configured to be used for both the fine pitch pattern and the coarse pitch pattern and detect transmitting light or reflected light from the scale, the transmitting light and the reflected light being emitted from the light source;

a signal processing unit including a first initial-stage amplifier unit configured to generate a position detection signal from the photo detector array; and a control unit configured to use an output signal from the first initial-stage amplifier unit to control a light amount variation of the light source, wherein the optical encoder is configured to operate in a high resolution detection mode to form an arrangement of a light receiving surface of the photo detector array at a first pitch in the measuring direction to detect the fine pitch pattern and a low resolution detection mode to form an arrangement of a light receiving surface of the photo detector array at a second pitch in the measuring direction to detect the coarse pitch pattern, the optical encoder includes a second initial-stage amplifier unit to which an output of an unused photo detector of the photo detector array is inputted when there is the unused photo detector which is not used to detect position in at least one of the high resolution detection mode and the low resolution detection mode, and the control unit controls the light amount variation of the light source on the basis of a sum signal of output signals from the first initial-stage amplifier unit and the second initial-stage amplifier unit when there is the unused photo detector.

* * * * *